United States Patent [19]

Pastor

[11] 4,088,116

[45] May 9, 1978

[54] RADIANT ENERGY COLLECTOR

[76] Inventor: Jose Pastor, 191 Wilton Rd., Westport, Conn. 06880

[21] Appl. No.: 646,974

[22] Filed: Jan. 6, 1976

[51] Int. Cl.² .............................................. F24J 3/02
[52] U.S. Cl. .................................... 126/270; 126/271
[58] Field of Search ................................ 126/270, 271

[56] References Cited

U.S. PATENT DOCUMENTS

| 3,130,084 | 4/1964 | Loring | 126/270 |
|---|---|---|---|
| 3,923,039 | 12/1975 | Falbel | 126/271 |
| 3,957,031 | 5/1976 | Winston | 126/270 |
| 3,968,786 | 7/1976 | Spielberg | 126/271 |
| 3,974,824 | 8/1976 | Smith | 126/271 |

FOREIGN PATENT DOCUMENTS 1,165,672  6/1958  France ................................ 126/270

Primary Examiner—John J. Vrablik
Attorney, Agent, or Firm—Frank J. Thompson

[57] ABSTRACT

A radiant energy collector is described having a generally scroll-shaped configuration and exhibiting a hemispheric energy acceptance angle. Substantially all diffuse and direct radiant energy which is incident on a reflective surface of the collector is reflected toward an elongated energy conversion means. In one arrangement, the energy conversion means comprises a fluid container in which a transfer fluid is heated. In another arrangement, the energy conversion means comprises means for converting incident radiant energy into electrical energy.

31 Claims, 16 Drawing Figures

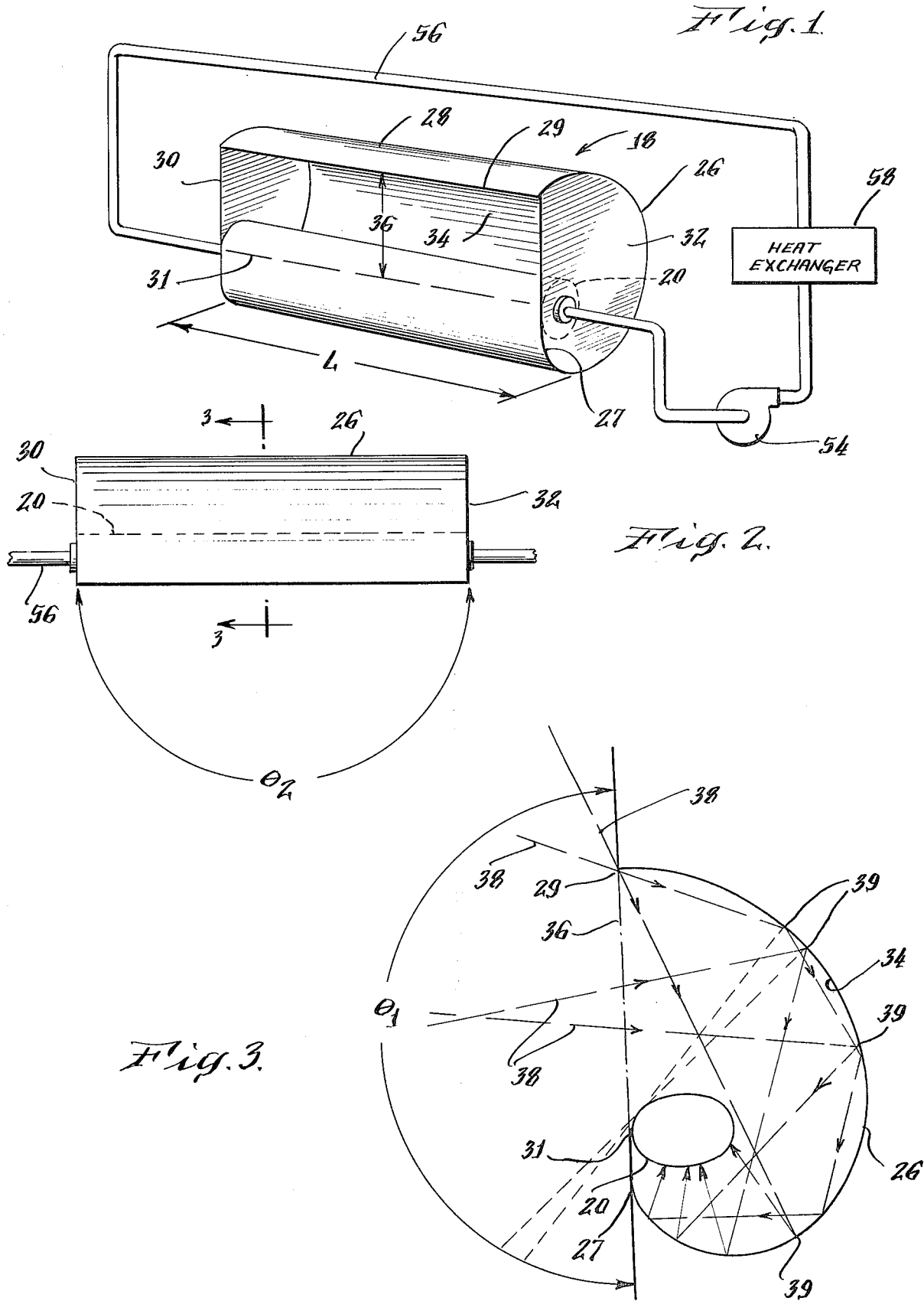

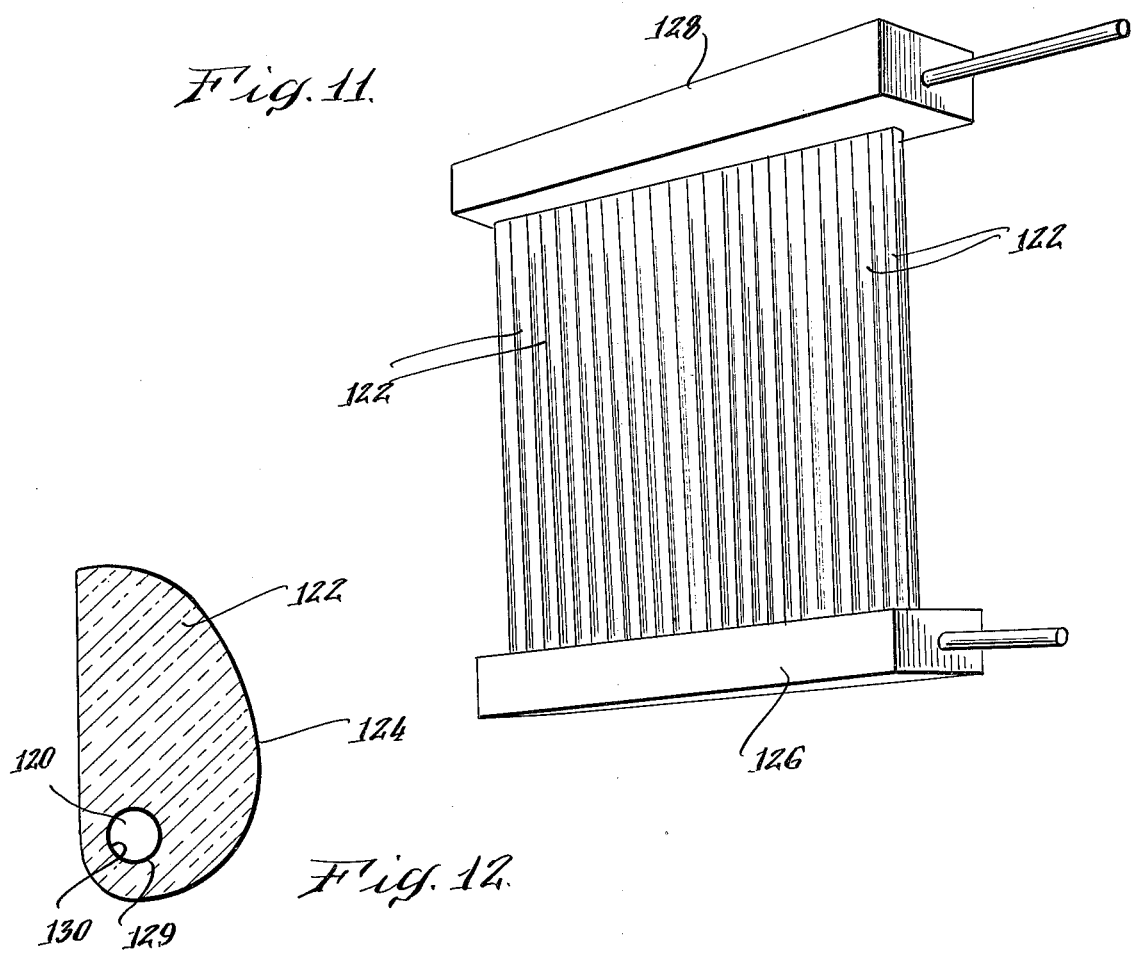
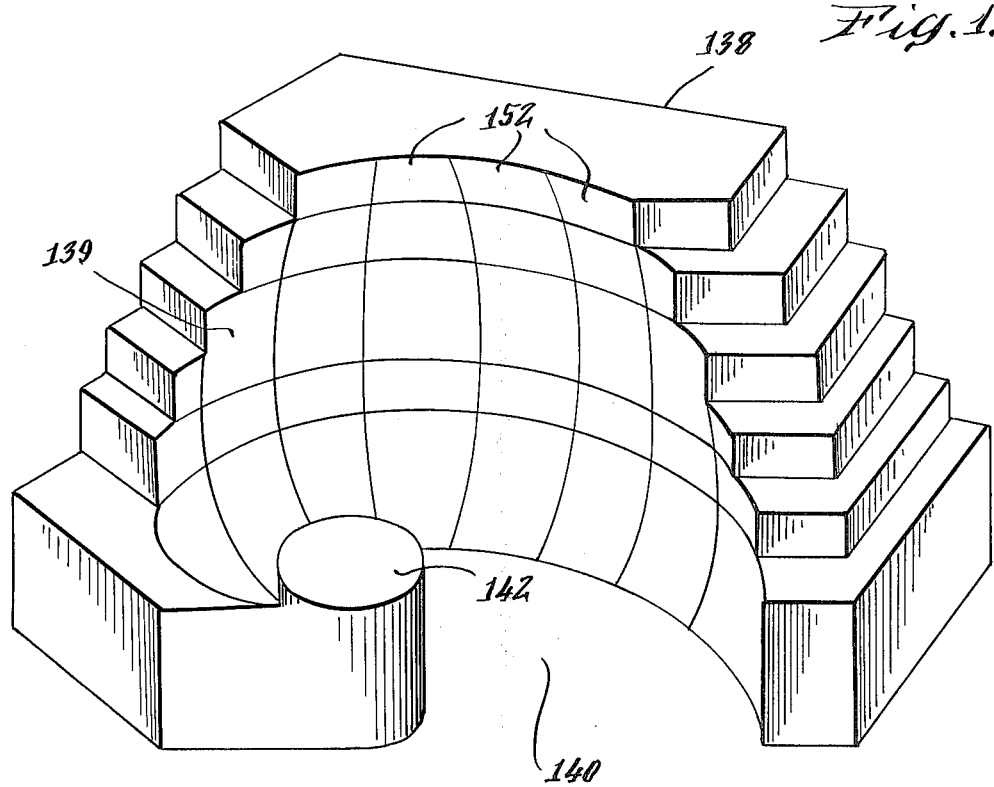

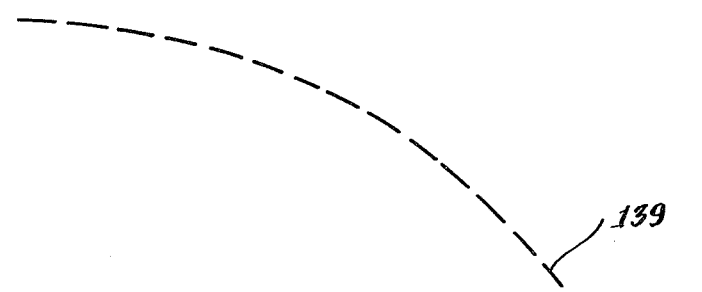
Fig. 14.
Fig. 16.
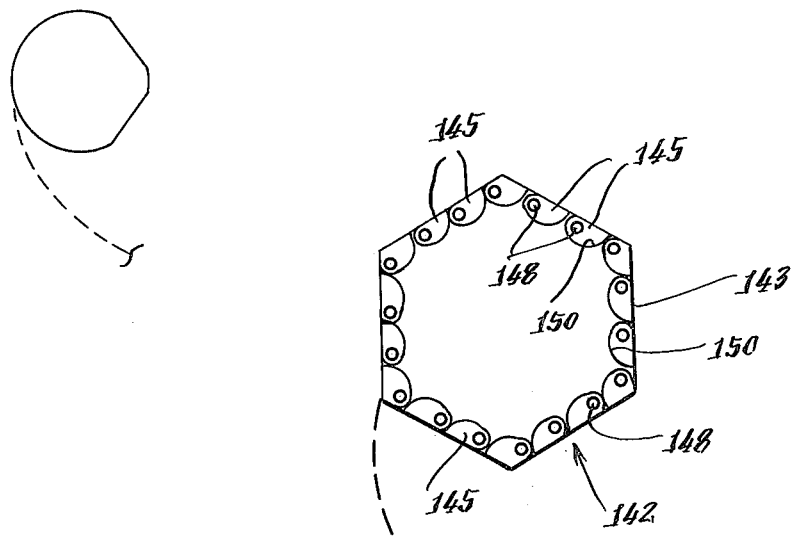
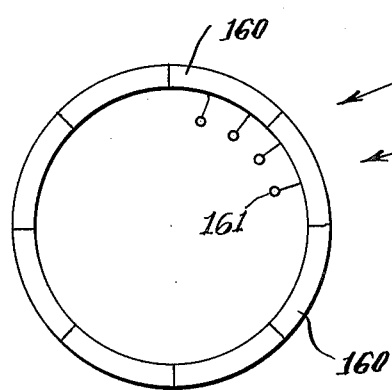
Fig. 15.

RADIANT ENERGY COLLECTOR

BACKGROUND OF THE INVENTION

This invention relates to apparatus for collecting solar energy. The invention relates more particularly to an improved arrangement for efficiently collecting diffuse solar energy from the hemisphere in front of the apparatus.

Various techniques and arrangements have beem employed through the years in an attempt to utilize the radiant energy of the sun. Apparatus provided for this purpose take into account two characteristics of solar energy and its source which to a large degree control the structure and arrangement of the solar energy gathering apparatus. The first characteristic relates to the fact that solar energy is radiant energy which occurs in the form of a wavefront or flux and is extended over an area so as not to form a relatively concentrated source of energy. While certain relatively low temperature operating devices such as planar arrays of solar panels are adapted to obtain energy directly from the sun in this form, other devices require a relatively greater concentration of energy and therefore require a means for concentrating solar flux on a body or area. This means generally comprises a reflector which causes directly incident rays of solar energy to be reflected toward a focal point where a utility body is positioned for impingement by the concentrated rays of energy.

The second characteristic of solar radiant energy is its continuous, periodically varying change of oncoming direction as determined by the earth's relationship to the sun in the solar system. The continuous relative motion between the earth and sun causes the position of the sun with respect to a location on earth to vary both daily and seasonally. The hour angle and thus the altitude of the sun varies continually during a solar day with respect to the horizon. Since the sun's position or altitude during the solar day will vary with respect to a fixed point on earth, the reflector is required to track the position of the sun in the sky in order to maintain the utility body and its focal point and to provide for efficient gathering and concentration of solar energy throughout the day. Apparatus adapted to track the sun requires a relatively complex and costly arrangement for providing motion of the reflector and/or corresponding motion of the utility body. In order to simplify this arrangement, various combinations of plano reflectors such as heliostats have been provided for reducing the required motion and the complexity of the arrangement. In other arrangements the reflector is stationary and the utility body tracks the focus of the reflector with the motion of the sun in the sky. In other such apparatus, the complexity is greatly reduced at the sacrifice of efficiency by providing a stationary disc shaped reflector, modified somewhat from a parabola, and a stationary utility body which is spaced from the focal point of the reflector so as to be impinged by a relatively-high, average solar energy during the period of time when the position of the sun falls within a particular range of altitudes.

In general, the prior systems are arranged for collecting direct, incident radiant solar energy. As such, they are subject not only to the variations in the position of the sun during the solar day but also to seasonal variations in declination of the sun and to daily variations in weather. Between the spring and fall equinoxes, the declination of the sun is north and increases to about 27.5° in mid June. Locations on earth in the northern hemisphere are then exposed to longer periods of solar energy at relatively higher declinations than locations in the southern hemisphere. Conversely, between the fall and spring equinoxes, the declination of the sun is south and locations in the southern hemisphere experience greater exposure to sun during a solar day. Furthermore, atmospheric cloud cover and the like shade the earth from the solar energy and can seriously interfere with efficient gathering of solar energy.

Heretofore, attempts in usefully collecting solar energy have been principally directed toward efficiently gathering direct solar energy. Diffuse solar energy generally exhibits a relatively lower energy content per unit area than does direct solar energy and because of its diffuse characteristic, it has been relatively difficult to efficiently gather or collect. However, this form of solar energy is generally more uniformally available throughout the day and is substantially more independent of seasonal and weather variations than is direct solar energy. It would be beneficial to provide a means capable not only of collecting direct solar energy but also adapted for efficiently collecting diffuse solar energy.

Accordingly, it is an object of this invention to provide an improved apparatus for collecting solar energy.

Another object of the invention is to provide an improved apparatus for collecting diffuse solar energy.

Another object of the invention is to provide a relatively efficient apparatus for the collection of diffuse solar energy.

A further object of the invention is to provide a solar energy collection adapted for efficiently collecting diffuse solar energy and for collecting direct solar energy.

SUMMARY OF THE INVENTION

In accordance with features of this invention, an improved radiant energy collector comprises an elongated reflective surface and an elongated energy conversion means. The reflective surface has a length and is continuously curved in a direction normal to the length of the surface. The energy conversion means has a body which extends substantially parallel to the length of the reflective surface adjacent an edge of that surface and is positioned with respect to the surface for impingement by substantially all of the radiant energy which is reflected from the surface. This is accomplished by positioning the body and the reflective surface for providing that cross sections of the body defined by the intersection of the body with planes of incident radiant energy are located within reflection half-planes and the normals to the surface are contiguous with a periphery of the cross section. With this arrangement, substantially all solar radiant energy which impinges on the surface is reflected one or more times and impinges upon the energy conversion body.

In accordance with other features of the invention, the reflective surface and energy conversion body have a scroll-like configuration which defines an aperture through which radiant energy projects and impinges on the reflective surface. The aperture has a width which is substantially equal to the length of a perimeter of the energy conversion body. The radiant energy collector thereby provides a hemispheric or $2\pi$ stearadians acceptance angle.

The energy conversion means comprises a means for converting the radiant energy into heat energy or alternatively into electrical energy. In one particular embodiment, the energy conversion body comprises an elongated fluid container or conduit having a convex cross section which comprises, for example, a polygonal cross section or a continuously curved cross section. When the body has a polygonal cross section, the reflective surface means comprises a continuous surface formed by a plurality of successively positioned curved segments wherein all of the normals associated with a curved segment intersect a single vertex of the polygon. The normals to successively positioned curved segments intersect successively positioned verticies of the polygon. As the number of the sides in the polygonal cross section increases, the body cross sectional configuration approaches a curve. For a body having a curved section, the reflective surface has a curve which is the involute of the shape of the cross section of the energy conversion body.

In accordance with other features of the invention, the energy conversion body itself may be formed by a plurality of energy collectors each having an energy conversion body and reflective surface as described.

A diffuse and direct solar energy collector is thus provided which exhibits an acceptance angle of about $2\pi$ stearadians thereby providing relatively efficient gathering of direct and diffuse solar energy and which traps and collects the energy with a relatively high degree of efficiency.

DESCRIPTION OF THE DRAWINGS

These and other objects and features of the invention will become apparent with reference to the following specification and to the drawings wherein:

FIG. 1 is a perspective view of a radiant energy collector apparatus constructed in accordance with features of one embodiment of this invention;

FIG. 2 is a plan view of the collector of FIG. 1;

FIG. 3 is an enlarged section view taken along lines 3—3 of FIG. 2;

FIG. 11 is a perspective view of an alternative assembly of solar collector elements constructed in accordance with an alternative embodiment of the invention;

FIG. 12 is an enlarged cross sectional view of a collector element of FIG. 11;

FIG. 13 is a perspective view of a building structure constructed in accordance with one embodiment of this invention;

FIG. 14 is a fragmentary cross sectional view of the structure of FIG. 13;

FIG. 15 is a section view of an energy conversion body having photo-sensitive radiant-to-electrical energy conversion means; and, FIG. 16 is a cross section of a heat absorbant body having curved and linear segments.

DETAILED DESCRIPTION

Figure 4:
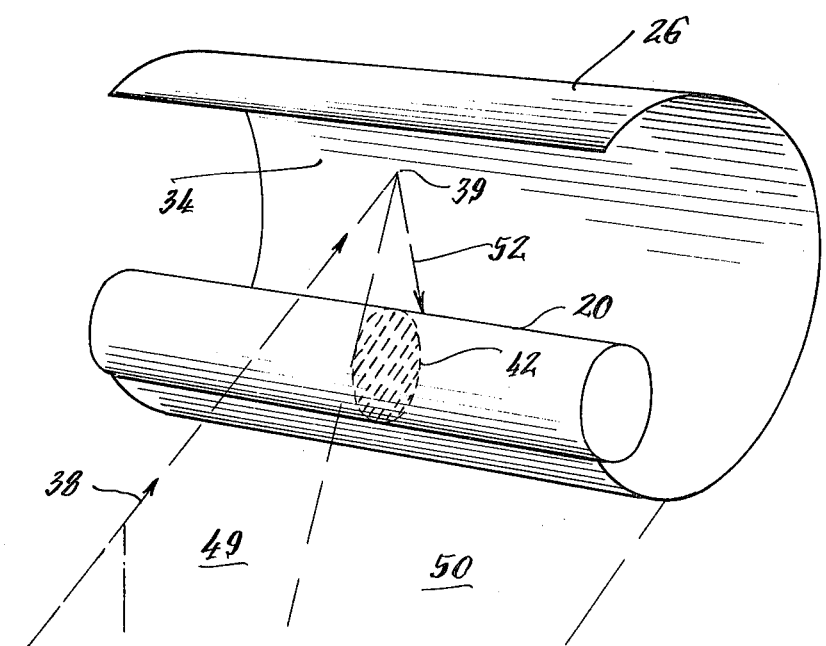
FIG. 4 is a fragmentary enlarged view of a segment of the solar collector of FIG. 1.

Referring now to the drawings there is illustrated in FIG. 1 a generally scroll shaped radiant energy collector 18 particularly suitable for collecting solar radiant energy. The collector includes an energy conversion means. The conversion means provides radiant energy to thermal energy conversion or, alternatively, radiant energy to electrical energy conversion. A radiant energy to thermal energy conversion means is shown in FIG. 1 to comprise an elongated fluid containing means shown to be a body 20. The body 20, which is formed as a container or conduit is adapted to be heated when radiant energy impinges thereon. A heat transfer fluid located therein is thus heated by contact as well as by radiant energy penetrating the body. Alternatively, as described hereinafter, the body is translucent and a heat transfer fluid is heated directly by absorption of radiant energy. The body 20 is formed of a metal or other material that adsorbs solar radiant energy and is arranged as a hollow, elongated body having a convex, curved cross section as illustrated in FIG. 3. While the cross sectional configuration of this body is oblong the cross section may have other convex cross sectional shapes as is indicated hereinafter. The outer surface of the body 20 is preferably blackened by painting or the like in order to provide for efficient absorption of radiant energy which is incident thereon. As indicated hereinafter with respect to FIG. 15, the energy conversion means alternatively comprises radiant to electrical energy conversion means.

A reflective surface means, referenced generally as 26, is provided and is shown to have a elongated curved surface segment 28 extending substantially coextensively in length with the body 20. The reflective surface means 26 is also shown in FIG. 3 to have a strip segment 27; The surface segment 28 curves in a direction normal or transverse to its length L. This curved surface curves continuously. For purposes of this specification and the appended claims, the expression continuously curved surface is understood to mean a curved surface which is uninterrupted by linear segments and which extends substantially from a curve initiation segment 27 to a terminal edge 29. (FIGS. 1 and 3). Segment 27 is provided to facilitate manufacture of the assembly. It is not required in all instances and is not shown for example in other views of the drawings. The surface segment 28 is shown to extend rectilinearly in the direction of its length. End members 30 and 32 are positioned at distal ends of the segment 28 and the body 20. Alternatively, the surface segment 28 may also curve in the direction of its length and may be open ended as shown hereinafter with respect to FIG. 13. Body 20 is positioned adjacent an edge 31 of the segment 27 of the reflective surface means 26 to provide a generally scroll shaped configuration. The reflective surface means 26 and the end members 30 and 32 are fabricated of sheet metal, for example, and are integrally formed with segments 28 or are alternatively mounted thereto. Alternatively, the surface may be formed of other suitable materials such as plastic and the like. An inner surface 34 of the segment 28 as well as inner surfaces of the segments 30 and 32 are polished or silvered or otherwise treated for providing a high degree of reflectance therefrom. Thus, when radiant energy impinges upon these surfaces it is efficiently reflected.

The heat absorbent body 20 and the reflective surface means 26 of the generally scroll shaped assembly are positioned for providing that an aperture or window is formed by these bodies. In FIG. 1, this window is indicated generally by reference numeral 36 while in FIG. 3 the window is illustrated by a dashed and dotted line 36. This relative positioning of the body 20 and reflective surface means 26 to form the window 36 is provided by securing a portion of the periphery of the heat absorbent body 20 to the segment 27 and to the end segments 30 and 32 of the reflective means. This can be accomplished, for example, by welding, by the use of adhesive, by mechanical, or other suitable means. The window width is the length of the window measured along the line 36 between an outer edge of the body at the point of contact with the reflective surface at one side and the reflective surface at an opposite edge.

In FIG. 3, rays 38 of solar radiant energy represented by the lines are illustrated projecting through the window 36 and are incident on the reflective surface 34 at points 39. The surface 34 is shaped and is positioned relative to the body 20 in accordance with a feature of the invention for providing that substantially all such incident rays are reflected one or more times from the surface 34 and ultimately impinge upon the body 20. This is accomplished by establishing a predetermined geometrical relationship between the energy conversion body 20 and the surface 34. This geometrical relationship is best explained with reference to FIG. 4. A plane 40 is shown extending through the energy conversion means and defines a cross section 42 of the body 20. The section 42 is shown cross hatched for purposes of clarity in the drawings. The plane 40 is the plane of incidence which is defined by two lines, the incident ray 38 and a normal 44 to the surface 34 at the point of incidence 39. Plane 40 is divided by the normal 44 into half-planes 49 and 50 respectively. The half-plane 50 in which a reflected ray 52 and the normal 44 occur is the reflection half-plane. The body 20 has a plurality of such geometrical cross sections 42 and the body 20 and surface segment 28 are each relatively positioned for providing that every cross section 42 lies in an associated reflection half-plane. In addition, each normal 44 to the surface 34 is tangent to or contiguous with a perimeter of the cross section 42 of the body 20. Through this geometrical relationship, substantially all incident rays 38 will be reflected one or more times and will impinge on the energy conversion means 20. Efficient solar radiant energy collection is effected by thus providing a reflective surface and energy conversion body configuration and by positioning these components for providing that for any incident ray 38, all sections 42 are located in the half-plane 50 containing reflected rays. Thus this configuration provides an acceptance angle $\theta_1$ (FIG. 3) of 180°.

The cross sectional configuration of the energy conversion body 20 is preferably convex. Various convex configurations can be employed, as is described hereinafter and the curved reflective surface segment 28 is shaped to satisfy the above described geometrical relationship. When the convex cross section of body 20 comprises a polygon having a plurality of verticies successively positioned about the cross section perimeter, the continuous curved surface segment 28 comprises a plurality of curved circular segments. Each circular segment has a plurality of normals which intersect at one of the vertices of the polygon. The normals of successively positioned circular segments intersect successively positioned verticies of the polygon. The radius of each segment is equal to the radius of the previous segment increased by a length equal to the length of the side of the polygon between both consecutive vertices. The first radius is the length of the first side of the polygon. When the convex cross section of body 20 comprises a continuous curve, the normals to the curved reflective surface are tangent to the perimeter of the cross section and the shape of the curved surface becomes the involute of the shape of the body 20.

The acceptance angle $\theta_2$ of FIG. 2 is substantially 180°. The end walls 30 and 32 are also reflective, as indicated, and are substantially parallel to each other and normal to a longitudinal axis of the reflective surface means 26, thereby resulting in an effective length of the body of infinity. For a collector having a length L much greater than the width or diameter of the energy conversion body 20, the acceptance angle $\theta_2$ will approach 180° if the end walls are deleted. Thus, the use of the end walls is also advantageous since they provide for efficient collection of energy within practical and reduced dimensions.

In addition to the efficient trapping or collection of incident radiant solar energy, this arrangement also provides a relatively wide or hemispheric acceptance solid angle.

A heat transfer means is shown in FIG. 1 for removing thermal energy from the collector. Various forms of heat transfer means can be utilized. For example, there is illustrated a means for conveying a heat transfer fluid to the body 20 for removing heat therefrom which comprises a conduit 56 (FIG. 1) which conveys a fluid, such as a liquid or a gas, to and through the body 20 and to a heat exchanger 58 where thermal energy absorbed during residence or transit through the body 20 is removed. The heat exchanger may comprise a heat operated device, such as a space heating unit or the like. A pump 54 is also provided for causing circulation of the medium through the conduit 56, the body 20 and the heat exchanger 58. Circulation can also be provided by capillary action as discussed hereinafter with respect to FIG. 12. The heat transfer fluid which may comprise a liquid such as water, is heated by contact with the inner surface of the heat absorbent body and by any radiant energy which penetrates the body 20. Alternatively, the body 20 is formed of a translucent material such as glass or a light transmitting polymer plastic. In this case the heat transfer fluid is adapted to be directly heated by radiant energy. This is provided in one arrangement by utilizing a colored, preferably black, fluid.

Figure 5:
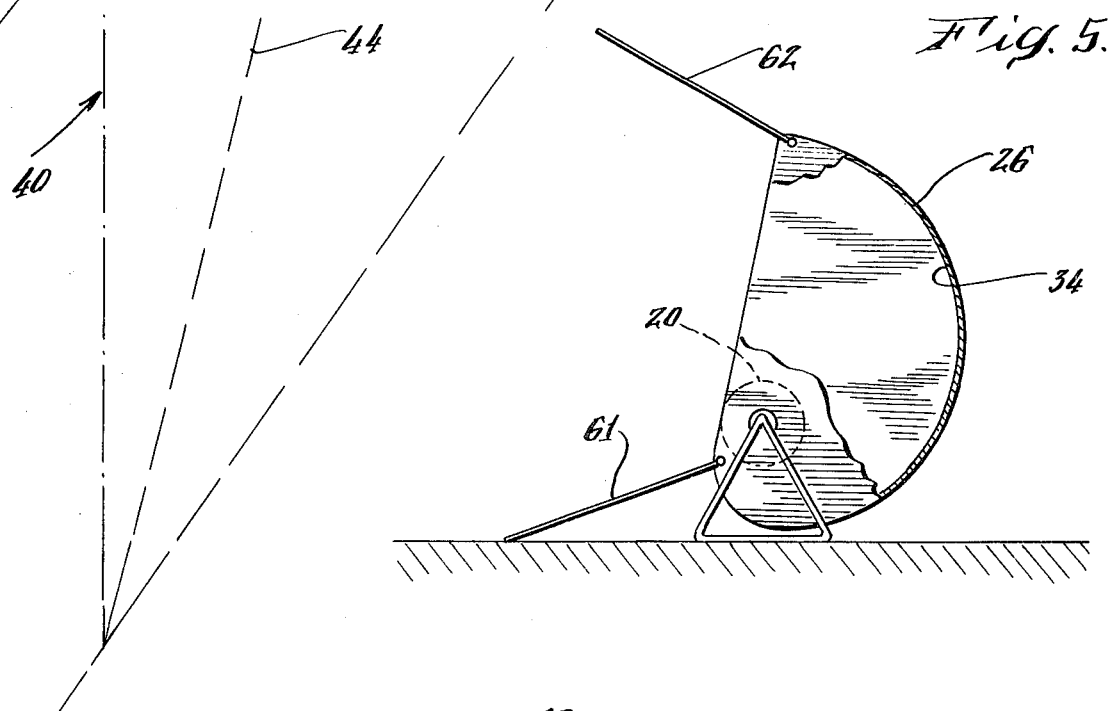
FIG. 5 is a side view of a solar collector constructed in accordance with an alternative embodiment for this invention.
Figure 6:
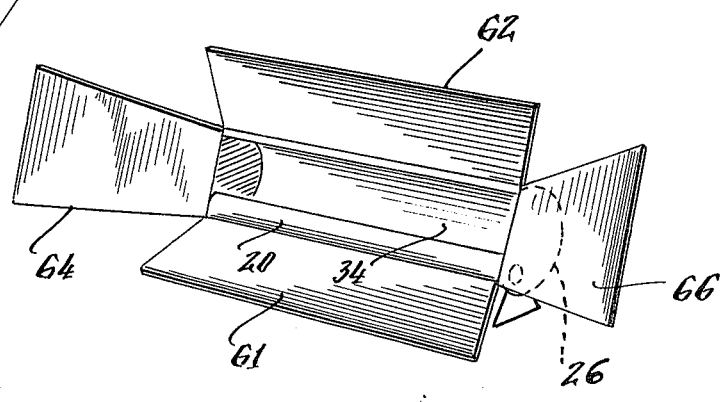
FIG. 6 is a perspective view of the solar collector of FIG. 5.

There is illustrated in FIG. 5 an alternative embodiment wherein the fluid containing means 20 has a circular cross sectional area. The surface 34 of the reflective surface means 26 is shaped to provide a curved surface which is the involute of the circular cross sectional area of body 20. The involute for the cross sectional area of body 20 will provide a reflective surface in which a normal to the surface 34 at the point of incidence of an impinging ray will be tangent to or intersect the body 20. The arrangement of FIG. 5 is further advantageous in that light reflective shields 61 and 62, each having reflective surfaces, enhance the radiant energy gathering characteristics of the energy collector. As illustrated in FIG. 6, reflectors 64 and 66 are also provided.

In addition to the oblong cross sectional configuration of the heat absorbent body of FIG. 1 and the circular cross sectional configuration of the body 20 of FIG. 5, the body may also be shaped into other cross sectional configurations. One characteristic of the radiant energy collector of this invention is that the width of the window 36 of FIG. 3 is equal in length to the perimeter of the convex body 20. An increase in temperature ΔT of the heat transfer fluid in the body 20 is related to the body configuration and is given by:

$$\Delta T = k \times \frac{\text{collection area} \times \text{solar constant}}{\text{volume of heat transfer fluid}} \times C$$

where $k$ is a coefficient of efficiency accounting for losses of energy by absorption and reflection and $C$ is the specific heat of the heat transfer fluid. Since the Collection Area is given by:

Collection Area = Perimeter of Cross Section × L where L is the length of the body 20 and the reflective surface means 26, and the Volume of the heat transfer fluid is given by:

Volume of fluid = Area of plane section of body × L then, ΔT is given by:

$$\Delta T = k \times C \times \frac{\text{perimeter}}{\text{area}} \times \text{Solar Constant}$$

An exemplary thermal transfer fluid is water for which C = 1. cal./gm. C°. If dimensions are given in centimeters and the solar constant is in calories/cm²/minute, then ΔT in dimensional units is:

$$\Delta T = \text{° C/min.}$$

One cal/CM³ raises the temperature of water 1° C. Therefore, $$\Delta T = k \times \frac{\text{perimeter}}{\text{area}} \times S \frac{\text{° C}}{\text{min.}}$$

The rate at which the temperature of the heat transfer medium in the body is raised in terms of the dimensions of the body 20 is indicated by the latter relationship. Thus, ΔT can be controlled by increasing the perimeter of the body while maintaining its cross sectional area constant; by decreasing the area for a constant perimeter; by a combination of the latter two techniques; and, by making the body 20 smaller. In the latter case, the area which is a function of the second power of the dimension of the body decreases more readily than the perimeter which is the function of the first power of the same dimension.

Figure 7:
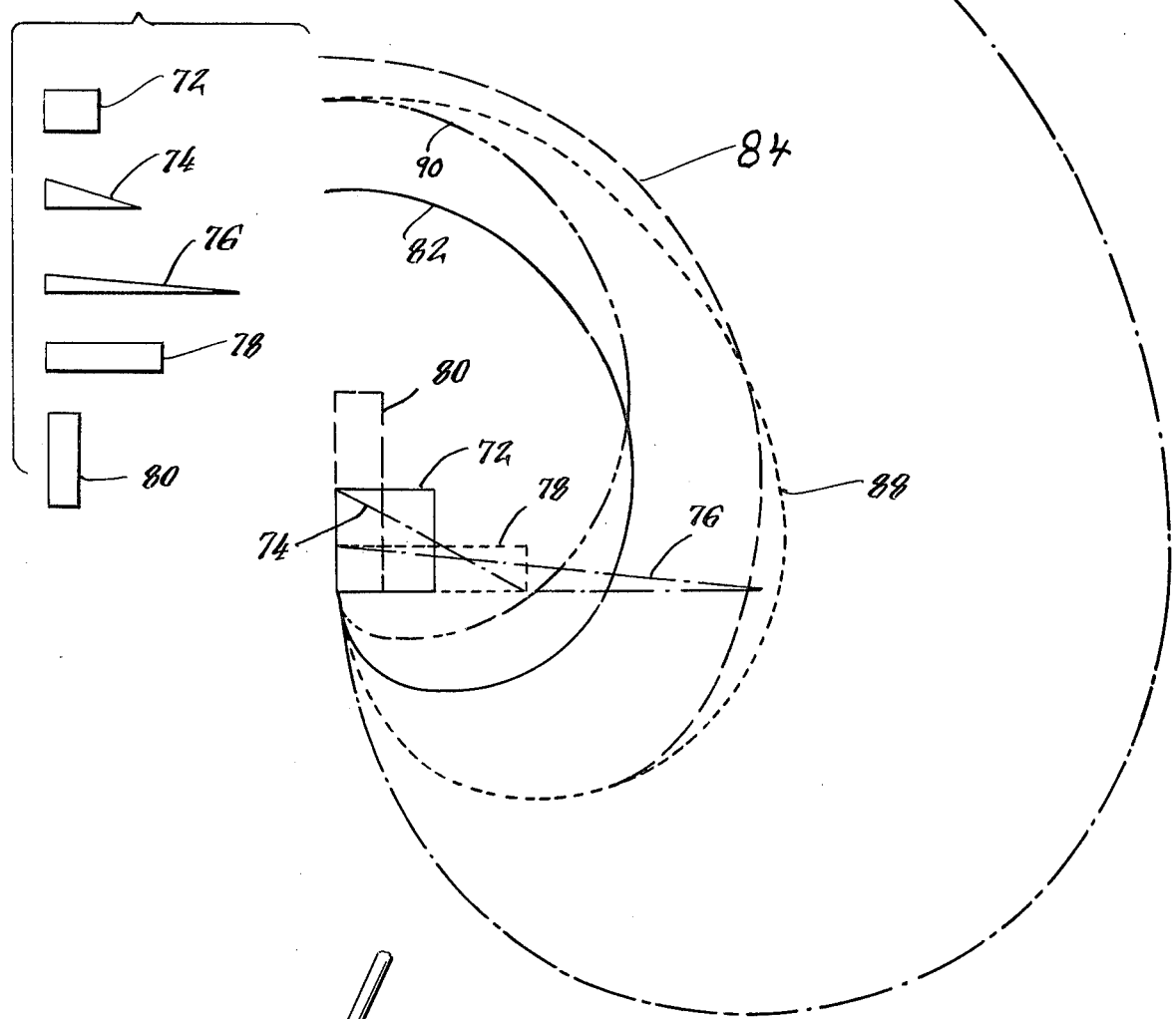
FIG. 7 is a side view of a solar energy collector constructed in accordance with features of this invention and which illustrates a plurality of heat absorbent body configurations each having the same cross sectional area and associated curved reflective surfaces.

There is illustrated in FIG. 7 a plurality of bodies 72, 74, 76, 78 and 80 and associated reflective surfaces 82, 84, 86, 88 and 90 respectively wherein the cross sectional area of each of the bodies is substantially equal. For a given cross sectional area, a circle is the geometrical configuration with the smallest perimeter. For a given area, any body having a convex shape differing from a circle will exhibit a greater ΔT. FIG. 7 shows that without changing the volume of heat transfer medium, the collection area can be increased and therefore ΔT increased. In FIG. 7 the triangular shaped body 76 has the largest perimeter for a given area and will therefore exhibit the greatest ΔT.

Figure 8A:
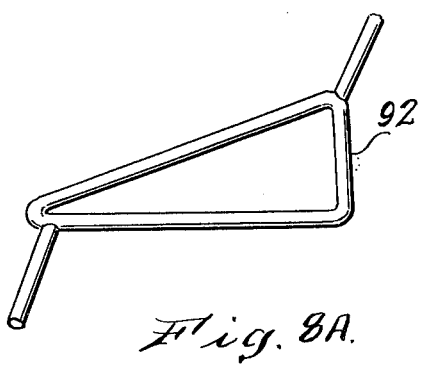
FIGS. 8a and 8b are side views of heat absorbent bodies having alternative means for conveying a heat transfer medium.
Figure 8B:
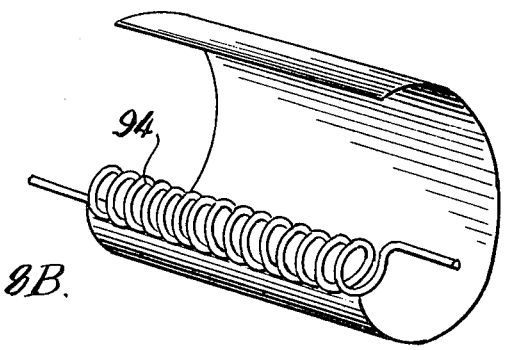

FIGS. 8a and 8b illustrate arrangements for increasing ΔT by maintaining the perimeter constant and reducing the area of the cross section. These arrangements comprise elongated tubular bodies 92 and 94 formed into coils as shown in FIGS. 8a and 8b respectively. In FIG. 8a the coil cross section is a polygon and conforms to a triangle while in FIG. 8b the coil cross section is curved and conforms to a circle. The coil cross section can also be shaped to conform to other convex polygonal or curved configurations.

Figure 9:
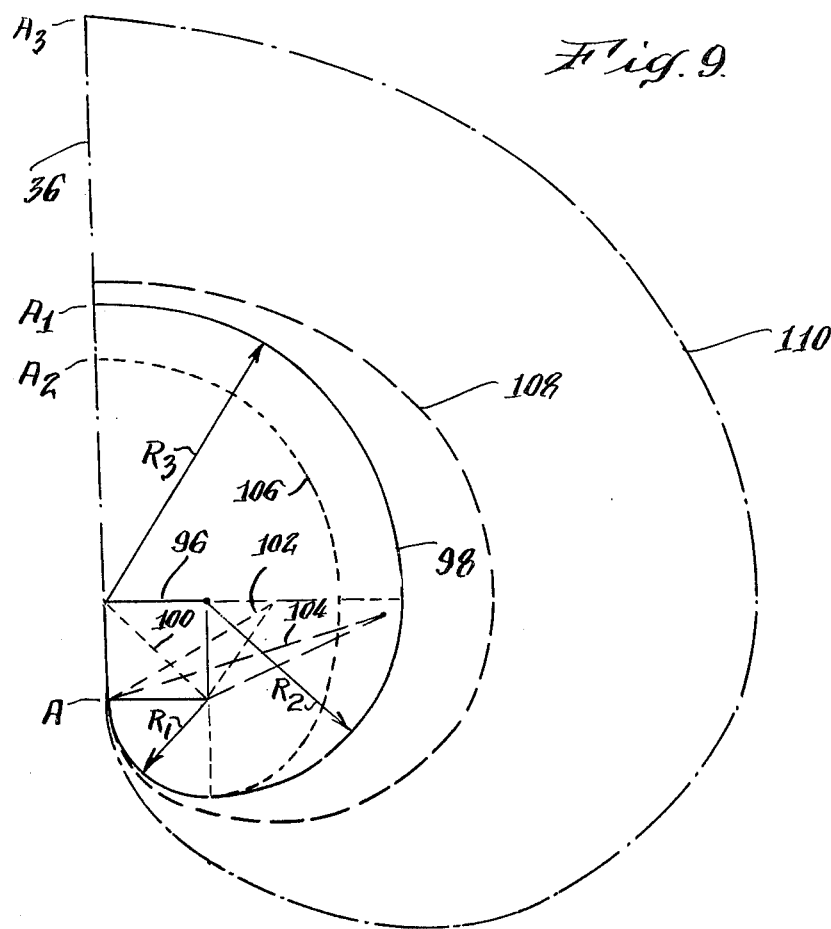
FIG. 9 is a side view of alternative body and collector arrangements of different cross sectional areas.

FIG. 9 illustrates an arrangement wherein the temperature is increased by reducing the size of the body. The body 96 is associated with reflector 98 and bodies 100, 102 and 104 are associated with reflectors 106, 108 and 110 respectively. The area of body 96 is twice the area of each of the bodies 100, 102 and 104 and the perimeters of the bodies 100, 102 and 104 are always larger than half the perimeter of the body 96. Therefore ΔT for body 96 is always smaller than ΔT for bodies 100, 102 and 104. This can also be seen in the figure by comparing the heights of the associated aperture windows AA1, AA2, AA3 and AA4. The increase in ΔT is not linear with the increase in window height because larger collection areas correspond to larger perimeters resulting in a greater area of metal wall which is to be heated. This however, is not significant in view of the relatively low specific heat of the metals employed, such as copper and aluminum.

Figure 10:
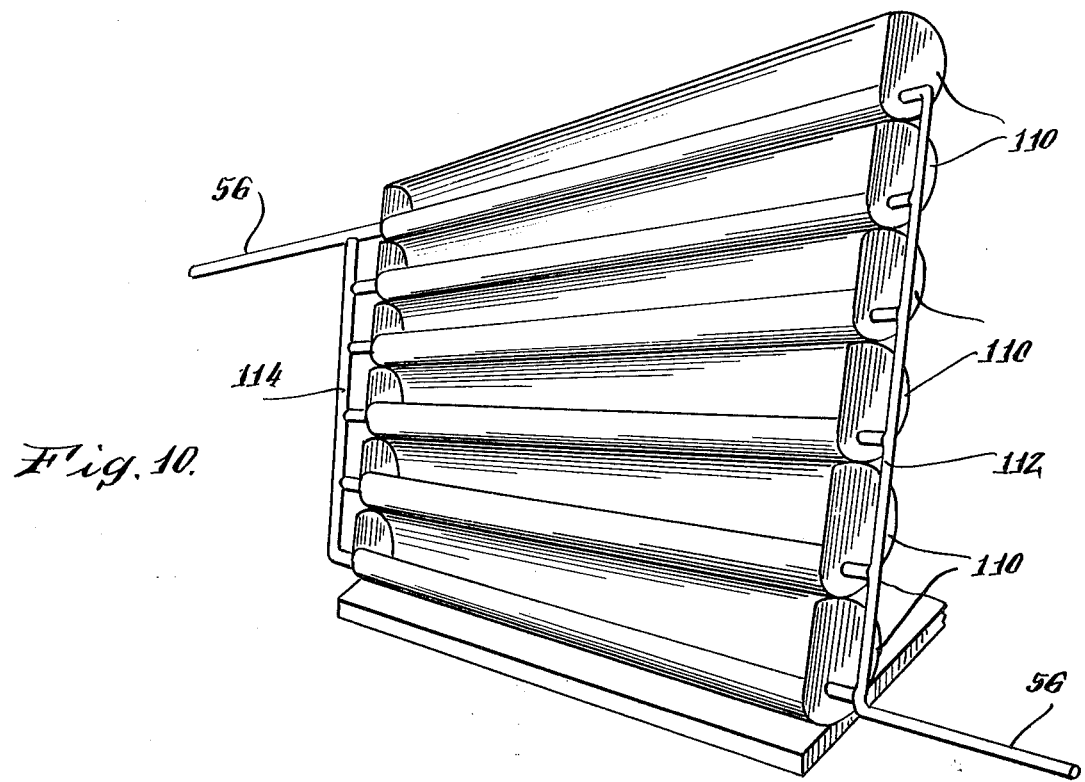
FIG. 10 is a perspective view of an assembly of solar collector elements constructed in accordance with features of an embodiment of this invention.

The features of this invention can be utilized in various structures. In FIG. 10, a plurality of solar energy collectors 110 are illustrated in a panel mounted array. Each of these collectors is constructed as described hereinbefore and they are mounted in an assembly to which the heat transfer medium is conveyed from an inlet manifold 112. A similar outlet manifold 114 is provided for conveying the heated effluent to the conduit 56. The panel of FIG. 10 does not have, to a first approximation, a preferred orientation with respect to incident solar energy. Therefore, it can be fabricated with vertically or horizontally orientated piping; it can be mounted at an angle with respect to the horizontal; it can be tilted with respect to the ecliptic or it can be adapted to any type of construction and can be integrally formed as part of the structure such as a south wall of a building. A further advantage is that by reducing the size of each element of the panel, the weight of the panel decreases. Thus, the load in a building or structure where the panel is incorporated also decreases. In one exemplary arrangement, the panel of FIG. 10 has a body 20 for each collector of approximately one half inch inside diameter pipe. Increased temperatures can be achieved with smaller sizes of pipe body.

FIG. 11 illustrates a solar panel assembly formed from a plurality of solar energy collectors which are constructed in accordance with an alternative embodiment of the present invention. In the arrangement of FIG. 12 the fluid containing means comprises an elongated bore or cavity 120 which is formed inside and extends through a solid body 122 of translucent material such as glass. The outside perimeter 124 of the body 122 is shaped to provide a reflective surface for reflecting solar radiant energy toward the bore 120. The bore 120 and reflective surface 124 are formed and positioned as described herein. A plurality of glass bodies 122 are arranged in the array as illustrated in FIG. 11 and the bores communicate with an intake manifold 126 at one end and an outlet manifold 128 at an opposite end. A surface 129 of the bore 120 is coated with a heat absorbing medium such as an adhering black film 130 which becomes heated upon impingement by solar radiation and transfers heat to the liquid flowing in the capillary. As an alternative to forming the film 130 on the surface of the bore, the heat transfer fluid may comprise a dark, heat absorbent fluid which, for example, is colored black.

The bore 120, in accordance with one embodiment of the invention has a relatively small cross sectional area for providing motion of the fluid therein as a result of capillary forces. Because of this capillary construction, the fluid will rise vertically within the capillary tubing without external pumping aid. In FIG. 11, each of the bores 120 of the glass bodies 122 communicates with the inlet manifold and with the outlet manifolds. This arrangement can theoretically provide a ΔT of 60° C/min.

FIG. 13 illustrates a building structure 138 constructed in accordance with the solar energy collecting features of this invention. The structure which may comprise a residential, office or industrial building includes a vertically extending reflecting wall surface 139 and a central courtyard 140 in which is located a cylindrically shaped, vertically extending fluid containing means comprising a heat absorbent body 142. In one example, the heat transfer fluid comprises water, which is conveyed to the body 142 and is flowed over the inner surfaces of the body where it is heated by transfer of thermal energy from the inner surface of this body. It is then conveyed to a heat exchanger for heating the building structure or to other heat exchanging utility devices.

Alternatively as illustrated in FIG. 14, a wall 143 of the body 142 may comprise a plurality of vertically orientated solar collectors 145 each of which is positioned adjacent the wall 143 for impingement by light reflected from the principal reflective surface 139. The solar collectors 145 comprise vertically orientated bodies 148 which may be metal pipes and reflective surfaces 150 constructed in accordance with the invention as described hereinbefore. The solar collectors may also comprise collectors as described hereinbefore with respect to FIGS. 11 and 12.

The vertical wall 139 comprises a reflective surface which has a curved, configuration as shown in the plan section of FIG. 14, and which is shaped as described hereinbefore. Its surface is formed of semitransparent window material. A portion of incident radiant solar energy is transmitted for illuminating the interior of the building and a portion is reflected, as described hereinbefore, toward the heat absorbent body 142.

The wall 139 is also curved in a vertical direction for principally focusing direct incident radiant energy at the body 142 and compensating partially for the non-parabolic segments of the reflective surface means 26 of FIG. 1. As illustrated in FIG. 13, the wall includes a plurality of meridional sections 152. Each meridional section is curved in a vertical plane and is defined by a vertical plane that contains all the normals to the horizontal sections of the wall at the point of intersection of the meridional plane with the horizontal section. Each meridional section is parabolic shaped having a focal point located at the intersection of the meridional plane, the body 142 and an upper horizontal plane of the body 142. The maximum height and length of the body 142 is defined by the latitude of the building location. Thus, the body can be supported off the ground, and, the incident solar energy on the body can vary with the position of the sun in the sky. The building wall surface thus provides a combination of techniques for functionally collecting radiant solar energy and in addition it is stylized for appearance.

In FIG. 15, the energy conversion means is shown to comprise means for converting radiant energy into electrical energy. FIG. 15 illustrates a cross section of the body 20 having a plurality of solar cells 160 supported in an array on the body. The solar cells comprise photosensitive semiconductor material adapted to generate an electric potential when radiant energy impinges on a surface of the cell. The cells each include output leads 161 which can be coupled in parallel, in series or in combinations of these electrical connections to provide the desired output potential and source impedance.

Alternatively, the semiconductor material is deposited on the surface of the body 20 to provide a continuous extended cell on which radiant energy impinges or is segmented to satisfy particular needs.

An improved apparatus has thus been described for the collection of diffused and direct radiant energy. The apparatus is advantageous in that it provides highly efficient collection of the energy at high acceptance angles. The described apparatus is further advantageous in that it is incorporated into various arrangements including panel assemblies and building structures.

While I have described particular embodiments of my invention, it will be apparent to those skilled in the art that variations may be made thereto without departing from the spirit of the invention and the scope of the appended claims.

What is claimed is:

1. A radiant energy collector comprising:
   A. an elongated reflective surface means having a curved surface for reflecting radiant energy which is incident on said curved surface, said surface means having a length and an edge, said edge extending in a direction of said length, and said curved surface curving continuously in a direction normal to said length;
   B. an elongated energy conversion means comprising a body extending in the direction of said length adjacent said edge and positioned with respect to said reflective surface means for impingement by radiant energy which is reflected from said curved surface toward said body;
   C. said body having a plurality of cross sections which are defined by the intersection of the body with planes of incidence of substantially all radiant energy impinging on said curved surface;
   D. said reflective curved surface having a plurality of reflective half-planes each defined by a normal to said curved surface and by a reflected ray from said surface;
   E. said body and said reflective curved surface relatively positioned for providing that said cross sections are located within said reflected half-planes and said normals are contiguous with peripheries of said cross sections;
   F. said relative positioning of said body and curved surface forming an aperture through which radiant energy propagates and is incident on said surface, said aperture having a width extending in a direction generally normal to the length of said surface and which width is substantially equal in length to the perimeter of said body.

2. A solar radiant energy collector in accordance with claim 1 wherein said energy conversion means comprises photoresponsive means positioned along said body for providing an electrical potential when radiant energy is incident thereon.

3. A radiant energy collector in accordance with claim 1 wherein a body is formed by a plurality of individual solar energy collectors arrayed along a perimeter of an enclosed configuration and means are provided for removing energy from each of said individual solar energy collectors.

4. The solar energy collector of claim 1 including first and second end wall members positioned in opposite distal locations of said reflective surface and body.

5. A solar radiant energy collector in accordance with claim 1 wherein said body comprises an elongated fluid containing means for positioning a heat transfer fluid for heating said fluid by radiant energy which is reflected from said surface.

6. The solar radiant energy collector of claim 5 including heat exchange means for conveying a heat transfer fluid to and from said elongated fluid containing means.

7. The solar energy collector of claim 5 wherein said fluid containing means comprises a tubular conduit formed into a coil having a convex cross sectional configuration.

8. The solar energy collector of claim 5 wherein said fluid containing means comprises a tubular conduit formed into a coil having a triangular cross sectional configuration.

9. The solar energy collector of claim 5 wherein said fluid containing means comprises a tubular conduit formed into a coil having a circular cross sectional configuration.

10. The solar energy collector of claim 5 wherein said fluid containing means comprises an elongated radiant energy absorbent conduit having a surface thereof which is adapted to absorbent solar radiant energy.

11. The solar radiant energy collector of claim 10 wherein said conduit is formed of a heat absorbent metal.

12. The radiant energy collector of claim 5 wherein said fluid containing means comprises a translucent body and said heat transfer medium comprises a fluid which is colored for heat absorption upon impingement by radiant energy.

13. The radiant energy collector of claim 12 wherein said fluid is colored black.

14. The radiant energy collector of claim 5 wherein said fluid containing means comprises a translucent body having a bore formed therein and said reflective surface comprises a surface of said translucent body.

15. The radiant energy collector of claim 14 wherein said bore has a surface thereof and a film of heat absorbent material is positioned on said surface.

16. The radiant energy collector of claim 14 wherein said bore has a cross sectional area having a dimension for causing capillary motion of said fluid in said bore.

17. The radiant energy collector of claim 1 wherein said body has a convex cross sectional configuration which extends in a direction normal to the length of said body.

18. The solar energy collector of claim 17 wherein said cross sectional configuration comprises a combination of linear and curved segments.

19. The radiant energy collector of claim 17 wherein said cross sectional configuration comprises a polygon.

20. The solar energy collector of claim 19 wherein said cross sectional configuration comprises a rectangle.

21. The solar energy collector of claim 19 wherein said cross sectional configuration comprises a square.

22. The solar energy collector of claim 19 wherein said cross sectional configuration comprises a triangle.

23. The solar energy collector of claim 19 wherein said polygonal cross sectional configuration comprises a plurality of verticies and wherein said verticies are located successively about the periphery of said cross sectional configuration, said curved reflective surface includes a plurality of curved segments positioned successively in a direction normal to the length of said surface, each of said curved segments having a plurality of normals to the surface of the segment, said normals of any one associated segment extending from said associated segment to a single vertex, and the normals of successively positioned curved segments extending to successively positioned verticies.

24. The solar energy collector of claim 17 wherein said convex cross sectional configuration comprises a continuous curve.

25. The solar energy collector of claim 24 wherein said cross sectional configuration comprises a circle.

26. The solar energy collector of claim 24 wherein said curved reflective surface is shaped to provide a continuously curved surface which is the involute of said curved cross section.

27. The solar energy collector of claim 1 wherein said elongated body is vertically extending and said reflective surface means comprises a vertically extending surface of a building structure.

28. The solar energy collector of claim 27 wherein said vertically extending building surface is curved in a vertical direction for focusing solar energy at said vertically extending body.

29. A solar panel comprising:
A. an array of solar collectors;
B. Each of said solar collectors comprising an elongated reflective surface means having a curved surface for reflecting radiant energy which is incident thereon, said reflective surface means having a length and an edge thereof, said curved surface extending in a direction of said length and continuously curved in a direction normal to a length of said surface, and an elongated energy conversion means having a body extending generally parallel to the length of said surface means and adjacent said edge and positioned with respect to said curved reflective surface for impingement by radiant energy which is reflected from said curved surface toward said body, said body having a plurality of cross sections which are defined by the intersection of the body of planes of incidence of substantially all radiant energy impinging on said curved surface, said reflective curved surface having a plurality of reflection half-planes each defined by a normal to said curved surface and by a reflected ray from said curved surface, said body and said reflective curved surface relatively positioned for providing that said cross sections are located within said reflected half-planes and said normal is contiguous with a periphery of said cross section, intake and outlet manifold means for conveying a heat transfer medium thereto, and, said relative positioning of said body and curved surface forming an aperture through which radiant energy propagates and is incident on said surface, said aperture having a width extending in a direction generally normal to the length of said surface and which width is substantially equal in length to the perimeter of said body.

30. The solar energy collector array of claim 29 wherein said body comprises a translucent body having a bore formed therein and said reflective curved surface is provided by a surface of said translucent body.

31. The solar collector array of claim 30 wherein said bores are of capillary dimensions.

* * * * *